United States Patent [19]

Balatan

[11] Patent Number: 5,169,719
[45] Date of Patent: Dec. 8, 1992

[54] NONIONICALLY AND PARTIALLY ANIONICALLY STABILIZED WATER-DISPERSIBLE POLYURETHANE/ACRYLIC GRAFT COPOLYMERS

[75] Inventor: Sergio E. Balatan, West Bloomfield, Mich.

[73] Assignee: BASF Corporation, Southfield, Mich.

[21] Appl. No.: 417,998

[22] Filed: Oct. 6, 1989

[51] Int. Cl.$^5$ .................. B05D 1/02; B32B 27/40; C08F 283/04
[52] U.S. Cl. .................. 428/423.1; 427/421; 428/425.8; 525/455; 525/920
[58] Field of Search ........... 525/455, 920; 427/421; 428/423.1, 425.8

[56] References Cited

U.S. PATENT DOCUMENTS

| | | | |
|---|---|---|---|
| 3,624,020 | 11/1971 | Kiebert et al. | 260/29.6 |
| 3,684,758 | 8/1972 | Honig et al. | 260/29.6 |
| 3,684,759 | 8/1972 | Reiff et al. | 260/29.6 |
| 3,705,164 | 12/1972 | Honig et al. | 260/29.6 |
| 4,119,602 | 10/1978 | Lagur et al. | 260/29.6 |
| 4,198,330 | 4/1980 | Kaizerman et al. | 260/29.6 R |
| 4,318,833 | 3/1982 | Guagliardo | 524/457 |
| 4,403,085 | 9/1983 | Christenson et al. | 528/45 |
| 4,518,724 | 5/1985 | Kuwajima et al. | 523/501 |
| 4,521,546 | 6/1985 | O'Connor et al. | 525/455 |
| 4,584,354 | 4/1986 | Hudecek et al. | 525/920 |
| 4,730,021 | 3/1988 | Zom et al. | 524/457 |
| 4,794,147 | 12/1988 | Savino et al. | 525/440 |
| 4,918,129 | 4/1990 | Probst et al. | 524/457 |

FOREIGN PATENT DOCUMENTS

| | | |
|---|---|---|
| 167188 | 5/1985 | European Pat. Off. . |
| 0301733 | 7/1988 | European Pat. Off. . |

*Primary Examiner*—James J. Seidleck
*Assistant Examiner*—Thomas Hamilton, III
*Attorney, Agent, or Firm*—Jerry F. Janssen; Paul L. Marshall

[57] ABSTRACT

Water-dilutable polyurethane/acrylic copolymers which may be either completely nonionically stabilized or partially nonionically and partially anionically stabilized comprise the reaction product of an ethylenically terminated polyurethane macromonomer containing poly(oxyalklyene) segments and one or more ethylencially unsaturated monomers selected from acrylic acid, methacruylic acid, fumaric acid, styrene, vintyltoluene, and alkyl and hydroxyalkyl esters of acrylic, methacrylic, and furamic acids. The copolymers are useful as principal resins and as pigment grind resins in water-borne automotive base coat paint formulations.

32 Claims, No Drawings

NONIONICALLY AND PARTIALLY ANIONICALLY STABILIZED WATER-DISPERSIBLE POLYURETHANE/ACRYLIC GRAFT COPOLYMERS

TECHNICAL FIELD

This invention relates to water-dispersible polymers useful in the preparation of automotive coating formulations. More particularly, the present invention concerns water-dispersible polyurethane/acrylic graft polymers having utility as principal resins and as pigment grind resins in automotive coating compositions. This invention also concerns coating compositions containing such polymers, and articles of manufacture coated with such coating compositions.

BACKGROUND OF THE INVENTION

Multi-layer coating systems are well known in the coatings industry. One area in which multi-layer coating systems have become increasingly utilized is the area of decorative and protective coatings for automotive vehicles. A common multi-layer coating system for automotive application is the so-called "base coat/top coat" system in which a thicker layer of clear, unpigmented topcoat is applied over an underlying thinner layer of pigmented base coat. The base coat may contain reflective particulate flake materials such as aluminum flake or mica flake to impart "sparkle" to so-called metallic finishes.

These base coat/top coat coating systems may comprise either "wet-on-wet" one-bake systems in which the clear top coat layer is applied over an unbaked base coat layer with both layers being cured in a single subsequent bake curing step, or "multiple-bake" systems in which a clear coat is applied and cured over previously applied and cured base coats. Modern multi-layer coatings systems are typically of the wet-on-wet one-bake type which eliminate or minimize problems of adherence between the layers which may sometimes result with multiple-bake systems.

Early base coat/top coat coating systems for automotive applications generally comprised solvent-borne, pigmented base coat compositions and solvent-borne clear coat compositions. However, rising costs of solvents and the growing concern over the environmental impact of organic solvents has forced research efforts in recent years to turn toward means for eliminating or minimizing the organic solvent content of coating compositions.

A certain degree of success has been achieved in lowering the total volatile organic content (VOC) of multi-coat systems by reducing the organic content of both the base coat and top coat compositions. For example, recent developments in multilayer coating systems have seen the introduction of water-borne base coat compositions. One example of such water-borne systems is disclosed in U.S. Pat. No. 4,794,147 which employs as principal resin and/or pigment grind resin a water-dispersible polyurethane resin. Coating formulations based upon these water-borne polyurethane resins can generally be applied to substrates over a broader range of ambient temperature and humidity conditions. Another type of water-borne system is exemplified by anionically stabilized acrylic resins of the type disclosed in U.S. Pat. No. 4,403,085 and 4,518,724. Acrylic resins are generally characterized by good durability and weatherability, but sometimes suffer from the shortcoming that they must be applied within a narrow range of temperatures and humidities to avoid problems of flow and sag.

Anionically stabilized acrylic resins are typically formed by the polymerization of a mixture of acrylic monomers which contains a certain fraction of carboxyl group-containing monomers such as acrylic acid or methacrylic acid. The resin is dispersed in water and stabilized in aqueous medium by conversion of at least a portion of the carboxyl groups to carboxylate salt groups by neutralization with a base, typically a tertiary amine.

Present-day commercially viable clear top coats typically are based upon alkylated melamine resins which are thermally cross-linked in the presence of one or more acid catalysts well known in the art. Acrylic resins which are cross-linked by melamine resins are presently the resins of choice for top coats because of their exceptional gloss and durability, qualities which are highly desirable for the clear top coat in a multilayer automotive coating system. A thorough discussion of so-called "monomeric" highly alkylated melamine resins and "polymeric," less highly alkylated melamine resins can be found in Kirsch, Albert J., "50 Years of Amine Coating Resins," the Winchell Co., Philadelphia, Pa., 1986, the contents of which are incorporated herein by reference.

The highly alkylated melamine resins generally require strong acid catalysis for curing, while the less highly alkylated melamines can be cured by the use of weaker, general acid catalysts. However, in either case, organic solvents are usually required to prepare melamine-containing clear coat formulations. The highly alkylated monomeric melamine resins typically form less viscous solutions in organic solvents, permitting higher solids loading, with attendant reduction in VOC. The less-alkylated, polymeric melamine resins, on the other hand, form more viscous solutions and cannot generally be employed to form high solids clear coat formulations.

With the introduction of acrylic anionically stabilized water-borne base coat compositions, and the desire to use high solids clear coats to reduce VOC, compatibility problems have arisen. The preferred highly alkylated monomeric melamine top coat resins, requiring strong acid catalysis for curing are generally not entirely compatible with anionically stabilized base coat resins. In wet-on-wet one-bake systems where the base coat resins are of the amine-neutralized carboxyl function-containing type, amine which is freed from the base coat layer during the baking step often neutralizes a portion of the strong acid catalyst employed to cure the highly alkylated melamine resins in the top coat. This can sometimes result in an incompletely cured top coat layer with attendant reduction in gloss, distinctness of image, durability and weatherability. On the other hand, if a bake curing step is imposed between application of the base coat and clear coat layers to eliminate this problem, intercoat adherence may suffer.

There is thus a need in the art for acrylic-based resins which can be employed in base coat paint formulations, which can be readily dispersed and stablizied in water, and which are compatible with high solids, highly alkylated melamine type top coat formulations.

SUMMARY OF THE INVENTION

The present invention provides, in its principal aspect, a water dilutable polyurethane/acrylic graft copolymer comprising the reaction product of A) an ethylenically terminated polyurethane macromonomer which is the reaction product of i) a polyisocyanate; ii) a compound having at least two functional groups reactive with isocyanate; iii) a polyether having a single functional group reactive with isocyanate; iv) an ethylenically unsaturated monomer containing a group that is reactive with isocyanate; and B) one or more other ethylenically unsaturated monomers. In another aspect, there are provided pigmented base coat paint formulations suitable for application to metal and plastic substrate bodies which comprise the above described polyurethane/acrylic graft copolymers. In yet another aspect of the present invention, there are provided substrate bodies coated with one or more base coat layers comprising the above-described polyurethane/acrylic graft copolymers.

DETAILED DESCRIPTION AND BEST MODE FOR CARRYING OUT THE INVENTION

The resins of the present invention are graft copolymers comprising an acrylic backbone with pendant polyurethane graft side-chains which serve to solubilize and stabilize the copolymers in aqueous media. The resins are particularly adapted for use as both the principal binder resin and as the pigment grind resin in waterborne coating formulations. The resins of this invention combine the best features of sprayability of polyurethane resin compositions and the durability of acrylic resin compositions into a single resin system. By varying the composition and ratios of ethylenically unsaturated monomers in the acrylic backbone, the composition of the polyurethane graft side chains, and the ratio of polyurethane side-chain segments to acrylic backbone, design of the resin system of the present invention provides for a full range of structural variation for optimizing the resin system for a particular application.

The resins of the present invention are formed by copolymerizing a mixture of monoethylenically unsaturated monomers and one or more polyurethane macromonomers which are terminated at one end with an alkoxy poly(oxyalkylene) alcohol and at the other end with a monoethylenically unsaturated unit. The polyurethane macromonomers are prepared by reacting a mixture of a) a polyisocyanate; b) an alkoxy poly(oxyalkylene) alcohol; c) a diol, triol, ester polyol, or mixture thereof; and d) a monoethylenically unsaturated monomer which has a single functional group reactive with isocyanate.

The polyisocyanate which is employed to form the ethylenically-terminated polyurethane macromonomers of this invention is essentially any polyisocyanate, i.e. any compound containing at least two isocyanate functional groups. The polyisocyanate may be a triisocyanate such as 1,2,4-benzene triisocyanate, polymethylene polyphenyl isocyanate, or may be the trimerized isocyanurate of an alkyl diisocyanate such as the isocyanurate of 1,6-hexamethylene diisocyanate. The polyisocyanate is preferably a diisocyanate, for example, hydrocarbon diisocyanates or substituted hydrocarbon diisocyanates. Examples of compounds which may be utilized include, but are not limited to p-phenylene diisocyanate, biphenyl 4,4'-diisocyanate, meta-xylylene diisocyanate, toluene diisocyanate (TDI), 3,3'-dimethyl-4,4'-biphenylene diisocyanate, 1,4-tetramethylene diisocyanate, 1,6-hexamethylene diisocyanate, 2,2,4-trimethylhexane-1,6-diisocyanate, 1,3-bis-[2-(2-(isocyanato)-propyl]benzene (also known as tetramethylxylyl-diisocyanate, TMXDI), methylene bis-(phenyl isocyanate), 1,5-naphthalene diisocyanate, bis-(isocyanato-ethyl fumarate), isophorone diisocyanate (IPDI), and methylene bis-(4-cyclohexylisocyanate). There can also be employed isocyanate-terminated adducts of diols such as ethylene glycol or 1,4-butylene glycol, etc. These compounds are formed by reacting more than one mol of diisocyanate, such as those mentioned above, with one mol of diol to form a longer chain diisocyanate. Alternatively, the isocyanate-terminated diol adduct may be formed in situ by addition of the diol together with the diisocyanate to the reaction mixture.

It is preferred to employ an aliphatic or cycloaliphatic diisocyanate or aliphatic isocyanurate since it has been found that these provide better color stability in the finished coating. Examples include 1,6-hexamethylene diisocyanate, the isocyanurate of 1,6-hexamethylene diisocyanate, 1,4-butylene diisocyanate, methylene bis-(4-cyclohexyl isocyanate), and isophorone diisocyanate (IPDI). However, aromatic diisocyanates in which the isocyanate groups are not directly attached to the aromatic ring such as TMXDI and meta-xylylenediisocyanate may also be used.

The alkoxy poly(oxyalkylene) alcohol employed in preparing the polyurethane macromonomers of this invention are oligomers formed by the alkoxyl-initiated polymerization of epoxides such as ethylene oxide, propylene oxide and the like. The compounds have the general formula

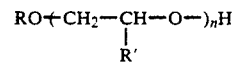

where R is lower alkyl, R' is hydrogen or lower alkyl, and the nominal value of n ranges between 20 and 75. The compounds, when R is methyl and R' is hydrogen (formed by the methyoxyl-initiated polymerization of ethylene oxide) are generally known as "MPEG's" (methoxy polyethylene glycols) and are commercially available, for example, from Union Carbide Co. in a variety of molecular weights. The compounds are marketed under the tradenames MPEG XXXX where XXXX is a number indicating the average molecular weight. For the purposes of this invention, the preferred alkoxy poly(alkylene oxide) alcohols are the MPEG's having weight average molecular weights in the range of between about 1200 and 3000. Particularly preferred are MPEG 1500 and MPEG 2000.

The diols and triols used in forming the polyurethane macromonomers of this invention are preferably aliphatic compounds, i.e. compounds having two or more hydroxyl functions per molecule and having a straight-chain, branched-chain, or saturated carbocyclic ring. The aliphatic diols and triols are believed to impart flexibility to the final copolymer. Examples include ethylene glycol, propylene glycol, butylene glycol, neopentyl glycol, trimethylolethane, trimethylolpropane, and similar diols and triols of up to twenty carbon atoms.

Similarly, ester polyols formed by esterification of a diol or triol of the types just discussed with a carboxylic acid or hydroxy acid may also be used. These compounds are characterized by at least two hydroxy groups and one ester group per molecule. Examples include monoesters of diols such as ethylene glycol, propylene glycol, butylene glycol, 1,6-hexanediol, trimethylolethane, trimethylolpropane and the like with hydroxy acids or alkyl-substituted hydroxy acids. Examples include hydroxyacetic acid, hydroxypropionic acid, 3-hydroxy-2,2-dimethylpropanoic acid and the like. A preferred ester polyol is the 3-hydroxy-2,2-dimethylpropyl ester of 3-hydroxy-2,2-dimethylpropanoic acid, commercially available as Esterdiol 204 from Union CArbide Company.

The monoethylenically unsaturated monomers having a single functional group reactive with isocyanate which are employed in the synthesis of the polyurethane macromonomers of this invention are preferably selected from hydroxyalkyl acrylates and methacrylates. Examples include hydroxymethyl acrylate, hydroxymethyl methacylate, hydroxyethyl acrylate, hydroxyethyl methacrylate, hydroxypropyl acrylate, hydroxypropyl methacrylate, hydroxybutyl acrylate, hydroxybutyl methacrylate, and the like. 2-Hydroxyethyl acrylate is particularly preferred.

The polymers of this invention may be nonionically stabilized, or partially nonionically and partially anionically stabilized. The monoethylenically unsaturated monomers which are chosen to synthesize the acrylic backbone of the resins of this invention are chosen, based upon a decision to design a completely nonionically stabilized resin or a partially nonionically/partially anionically stabilized resin. In the case of completely nonionically stabilized polymers, the ethylenically unsaturated monomers chosen to fabricate the acrylic backbone of the resin are free of carboxyl group-containing monomers such as acrylic acid, methacrylic acid, fumaric acid and the like. In this instance, the monomers for synthesis of the acrylic backbone are chosen from among the alkyl acrylates, alkyl methacrylates, hydroxyalkyl acrylates, hydroxyalkyl methacrylates, styrene, and the like. The composition of the final polyurethane/acrylic graft copolymer is then adjusted to contain a high degree of polar poly(oxylalkylene) segment in the polyurethane side-chain units to solubilize and stabilize the polyer in aqueous medium.

In the case of the partially nonionically and partially anionically stabilized polyurethane/acrylic graft copolymers of this invention, the ethylenically unsaturated monomers chosen to synthesize the backbone portion of the resins include small amounts of acrylic acid and/or methacrylic acid. Preferably, however, the amount of carboxyl group containing monomer (i.e. acrylic and/or methacrylic acid) is kept low.

In practice, the ratio of monomers employed in synthesizing the desired final polyurethane/acrylic graft polymer, including the ethylenically-terminated polyurethane macromonomer, is chosen so as to insure that the weight percent MPEG segment in the final polymer ranges between 5% and 25% by weight of the total resin, preferably between about 10% and 15% by weight. The percentage of MPEG segment depends in turn on whether the desired product is to be totally nonionically or partially anionically stabilized. If the product is to be totally nonionically stabilized, the percentage of MPEG segment should be toward the high end of the stated percentage ranges, i.e. between about 12% by weight to about 25% by weight.

On the other hand, if a partially anionically stabilized resin product is desired, acrylic acid, methacrylic acid, or a mixture of the two are chosen to form a fraction of the monomer employed in synthesizing the backbone portion of the polymer, and the amount of MPEG segment in the polyurethane side-chain stabilizing groups may comprise less of the total final polymer, ranging at the lower ends of the ranges discussed above, generally between about 5% and 15% by weight of the total final polyurethane/acrylic resin.

To prepare the ethylenically-terminated polyurethane macromonomers, the proportions of diisocyanate, hydroxyl functionalized monoethylenically unsaturated monomer, and diol and/or triol and nonionic stabilizer or monohydroxyfunctional polyether components are chosen so as to provide an alkyloxy(polyoxyalkylene)-terminated and ethylenically-terminated macromonomer. This may be accomplished by reacting a stoichiometric excess of the polyisocyanate, i.e. more than one isocyanate group per nucleophilic moiety (i.e. group reactive with isocyanate) in the other components with the hydroxyl functional group-containing reactants, i.e. diol, triol, ester diol, and alkoxy (polyoxyalkylene) alcohol in the presence of an antioxidant such as butylated hydroxy toluene. The preferred ratio of —N=C=O functionality to hydroxyl functionality is chosen to be between about 1.1 to about 1.2.

The reaction is allowed to proceed until analysis of the reaction mixture indicates that an isocyanate functionality of about 0.20 to about 0.40 meq/g, preferably about 0.25 remains. At this point, a capping agent is added and the reaction is allowed to proceed until all remaining isocyanate functionality has reacted. The capping agent may be a diol, or a amine polyol. Suitable diols for capping the free isocyanate functionality of the polyurethane macromonomer are straight-chain or branched chain aliphatic (i.e. saturated) diols of from three to twenty carbon atoms. Examples include ethylene glycol, propylene glycol, butylene glycol, neopentyl glycol, 1,6-hexanediol, and the like. Straight-chain or branched-chain amino polyols of from two to twenty carbon atoms may also be employed as capping agents. By the term "amino polyol" as used throughout this specification and the appended claims is meant an organic compound having one primary or secondary amine nitrogen atom and one or more hydroxyl groups. Examples of amine polyols which may be used to cap the polyurethane macromonomers of this invention include ethanolamine, diethanolamine, 4-(2-hydroxyethyl)morpholine, and the like.

The weight average molecular weight of the polyurethane macromonomer is generally between about 3,000 and 20,000 Daltons, preferably between about 6,000 and 13,000 Daltons.

The polyurethane macromonomer, thus prepared, is mixed with the blend of ethylenically unsaturated monomers which make up the acrylic backbone of the polymer and reacted in the presence of a suitable free radical catalyst to form the resins of this invention. The reaction is typically carried out under conditions of reflux in a suitably unreactive solvent such as toluene, xylene, or an alcohol such as n-butanol, iso-butanol, and the like. A free radical initiator is added to the reaction mixture together with the monoethylenically unsaturated monomers, and polyurethane macromonomer, with small amounts of catalyst added during later stages of the reaction if needed. Any suitable polymerization catalysts may be used to initiate copolymerization of the ethyenically unsaturated monomers and ethylenically-terminated polyurethane macromonomer including inorganic peroxy compounds such as potassium or ammonium persulfate, hydrogen peroxide or percarbonates; organic peroxy compounds such as acyl peroxides including, for example, benzoyl peroxide; alkyl hydroperoxides such as tert-butyl hydroperoxide, cumene hydroperoxide, and p-menthane hydroperoxide; dialkyl peroxides such as a di-tert-butyl peroxide; peroxy esters such as tert-butyl perbenzoate, tert-buytl peroctoate and the like; and mixtures thereof. The organic and inorganic peroxy compounds are advantageously used in combination with any suitable reducing agents known in the art, including sodium pyrosulfite or bisulfite, sodium formaldehyde sulfoxylate, triethanolamine, tetraethylene pentamine, and the like. Also azo compounds such as azo-bis-(iso-butyronitrile), azo-bis-(isobutyric acid ethyl ester), az i-bis-(isobutyroamidine) and the like may be employed as free radical initiators.

The initiator catalysts are employed in catalytic quantities normally used to initiate polymerization reactions of this type, i.e. generally in quantities of from about 0.01% to 5% by weight, preferably between about 0.02% and 1% by weight, based upon the total weight of ethylenically unsaturated monomer present in the reaction mixture.

As the reaction proceeds, the carbon-carbon double bond at the terminus of the monethylenically-terminated polyurethane macromonomer is incorporated into the growing acrylic backbone. The result is the formation of a polymer comprising an acrylic backbone with pendant polyurethane graft side-chains. The polymerization reaction conditions are controlled to permit the formation of a polyurethane/acrylic graft copolymer of weight average molecular weight of between about 15,000 and 60,000 Daltons, preferably between about 25,000 and 40,000 Daltons.

The polyurethane/acrylic graft copolymers of this invention, prepared as described above can be employed as the principal or binder resin or as the pigment grind resin in base coat paint formulations for automotive applications. When employed as principal resins, the resins are combined, in amounts generally ranging between about 10% by weight and about 40% by weight, based on total solids content of the base coat formulation, together with a pigment paste, a rheology control agent, leveling and flow additives, fillers, stabilizers, wetting agents, dispersing agents, adhesion promoters, etc. The pigment paste comprises a pigmenting agent (which may or may not additionally contain flake pigmenting agents such as aluminum flake, mica flake, or metal oxide encapsulated mica flake), and a pigment grind resin. The viscosity of the final base coat formulation is adjusted to the desired value by the addition of water.

Rheology control agents preferably incorporated into the base coat formulation help to control the viscosity of the resulting composition and are incorporated in amounts which prevent sagging or running after a base coat layer is sprayed onto a vertical substrate surface such as a motor vehicle body. The direct result of incorporating a rheology control agent is to provide flow control, body, and sprayability in the base coat formulation. Another favorable result of the inclusion of a rheology control agent is to allow for the application of thicker base coat layers during spraying, permitting better coverage and hiding of the substrate. The sprayed coatings containing these rheology control agents also exhibit better orientation of flake pigments such as aluminum or micaceous flakes which may be incorporated into the base coat formulation to provide a "metallic" sparkle effect.

Rheology control agents which can be used in embodiments of the present invention include fumed silica compounds, and hectorite and bentonite clays. Preferred fumed silica compounds are the hydrophobic fumed silicas such as Aerosil R972, available from Degussa Corporation, Frankfort, West Germany). Another preferred rheology control agent for base coat compositions of the present invention is a synthetic sodium lithium magnesium silicate hectorite clay. An example of one such clay is Laponite RD, available from Laporte, Inc., Saddlebrook, N.J. The reheology control agent may also comprise mixtures of the above-mentioned agents.

The rheology control agent may comprise from 0% to about 20% by weight of the basecoat composition, and generally comprises between about 1% by weight and 5% by weight of the final base coat composition. In general, the particle size of the rheology control agent plays a role in the overall thixotropic properties of the base coat formulations. The rheology control agents included in embodiments of this invention are suspended in the formulations and are believed to function, at least in part, through coulombic or electrostatic interactions. In general, the particle size ranges from less than about 0.01 microns to over about 200 microns. The particle size of the rheology control agent is selected to impart the desired flow, body, and sprayability of the finished base coat formulation. In most instances, the preferred particle size ranges between about 1 micron and about 10 microns.

Additional agents may also be included in the base coat formulations of this invention, for example surfactants, fillers, stabilizers, wetting agents, dispersing agents, adhesion promoters, etc. While agents serving each of these functions are well known in the art, the amounts used must be carefully controlled to avoid adversely affecting the coating and its drying characteristics.

When employed as a pigment grind resin, the polyurethane/acrylic graft copolymers of this invention are combined with one or more pigmenting agents known in the trade by conventional mixing, and then ground by ball milling, sand milling, passage through an attritor, or other known technique until the desired pigment particle size distribution is achieved. The paste is then diluted with water, if needed, to adjust the paste to the desired viscosity, and emloyed in base coat formulations as described above. In general, the resin will comprise from about 30% by weight to about 80% by weight of the total solids content of the pigment paste, preferably from about 40% to about 70% by weight.

The base coat compositions described hereinabove can be applied to a metal or plastic substrate in one or more coats using, for example, an air atomized spray gun such as a Binks Model 60 spray gun, available from the Binks Manufacturing Corp., Franklin Park, Ill., or by using other conventional spraying means. The base coat compositions are generally sprayed at a pressure of 50-80 psi (344.7-551-6 kPa), at a relative humidity of about 50% to 90% (preferably about 60% to 80%), and at temperatures between about 70°-90° F. (21.1°-32.2° C.)

After desposition of the base coat compositions, the base coat layer is flash dried at a temperature of between room temperature and about 145° F. (62.8° C.), preferably about 120° F. (48.9° C.). A second basecoat layer may be applied over the first without drying (flash off) or, alternatively, a clear coat layer may be desposited over the first flashed base coat layer. Any number of well known clear top coat compositions known in the art may be used to apply the top coat layer. For example a high solids solvent-borne top coat composition comprising a so-called monomeric highly alkylated melamine such as Cymel ® 303 (available from American Cyanamid Company, Wayne, N.J.) and a strong acid catalyst such as p-toluene sulfonc acid may be used. Alternatively, a top coat formulation utilizing a so-called polymeric less highly alkylated melamine such as Cymel ® 327 may be used. As stated earlier, when a highly alkylated melamine resin is employed in the top coat formulation, it is preferred that the principal resin and grind resin of the base coat formulation preferably be of the completely non-ionically stablized type free of carboxyl or carboxylate functionality. When a polymeric less highly alkylated melamine resin is employed in the top coat formulation, the principal and/or grind resins of the base coat may be either the complete non-ionically stabilized type in accordance with this invention or the partially anionically stabilized type. In this instance, the base coat principal or grind resins may also be a mixture of the completely nonionically stabilized (i.e. carboxyl or carboxylate functionality-free) type and the partially anionically stabilized (carboxyl or carboxylate functionality-containing) type.

After application of the clear coat layer over the previously applied base coat layer, the multi-layer coating is then baked to cross link the polymeric vehicles and to drive the small amounts of water and organic solvents from the layers. A preferred baking step involves heating the coated substrate for a period of from about 10 to about 60 minutes at a temperature of between about 150° F. (65.5° C.) and 300° F. (148.9° C.). This baking step cures the multi-layer coating to an attractive, glossy, hard, durable film.

The following examples are provided to enable one skilled in the art to practice the present invention. However, these examples are merely illustrative of the invention and are not to be read as limiting the scope of the invention as it is defined by the appended claims.

EXAMPLE 1

Preparation of Ethylenically-Terminated Polyurethane Macromonomer—I

A mixture of 953.4 grams of methoxy polyethylene glycol (MPEG 1500, available from Union Carbide), 75 g of hydroxyethyl acrylate, 85.4 g of trimethylolpropane, 423.4 g of isophorone diisocyanate, 280 g of methyl propyl ketone and 10 g of butyl hydroxy toluene was placed in a 5-liter, three-necked flask fitted with a stirrer and condenser. The mixture was heated to about 85° C. with stirring and held at that temperature until analysis indicated an isocyanate group functionality meq/g of about 0.74. At that point, 5.5 g of dibutyl tin dilaurate was added to the reaction mixture and the mixture was further stirred and heated at 80°-85° C. until analysis indicated an isocyanate group functionality meq/g of about 0.33. Diethanolamine (66.3 g) was added to cap the residual isocyanate functionality, and the mixture stirred and heated until analysis indicated the absence of isocyanate functionality.

The mixture was then cooled and 200 g of ethylene glycol monobutyl ether was added to the reaction mixture, followed a few minutes later by 4 g of butyl hydroxytoluene and then 200 g of deionized water. The mixture, 70% non-volatile content by weight, was filtered into a storage container for later use. The product resin contained 4.68% by weight hydroxyethyl acrylate and 59.46% methoxy polyethylene glycol based on the total weight of solids and was found to have a weight average molecular weight of about 7,000 Daltons and a viscosity on the Gardner-Holt scale of Z1-Z2.

EXAMPLE 2

Preparation of Ethylenically-Terminated Polyurethane Macromonomer—II

A mixture of the isocyanurate of hexamethylene diisocyanate (433 g, available as Desmodur N3390 from Mobay Chemical Corp., Plastics & Coatings Division, Pittsburgh, Pa. 15205), 36.4 g of neopentyl glycol, 1015 g of methoxy polyethylene glycol (MPEG 1500, available from Union Carbide), and 85 g of methyl propyl ketone were placed in a 5-liter flask fitted with a stirrer and condenser. The mixture was heated to 70° C., at which point a mixture of 41.3 g of hydroxyethyl acrylate, 80 g of methyl propyl ketone, and 6 g of butyl hydroxy toluene were added to the flask contents The temperature of the flask contents was raised to about 90° C. and the flask contents were stirred and allowed to react at this temperature for a period of about three hours.

Five grams of a 3.3% by weight solution of dibutyl tin dilaurate in methyl propyl ketone were added to the flask contents, and the reaction was allowed to proceed at 90°-95° C. until analysis indicated an isocyanate function group meq/g of about 0.21. Diethanolamine (37 g) was added to cap the residual isocyanate functionality and the mixture was allowed to react at 90°-95° C. until analysis indicated the absence of isocyanate functionality. Ethylene glycol monobutyl ether (250 g) was added to the flask contents and the mixture allowed to cool to about 70° C. At this point, 150 g of deionized water were added and the resulting mixture thoroughly mixed and filtered into a storage container for later use.

The product contained 71.5% non-volatiles and had a viscosity of U-V on the Gardner-Holt scale. The resin contained 66.4% methoxypolyethylene glycol and 2.7% hydroxyethyl acrylate, based on the total weight of solids, and had a weight average moleculare weight of about 13,000. Daltons.

EXAMPLE 3

Preparation of Ethylenically-Terminated Polyurethane Macromonomer—III

A mixture of isophorone diisocyanate (502.5 g), 123.0 g of trimethylolpropane, 25.5 g of the 3-hydroxy-2,2-dimethylpropyl ester of 3-hydroxy-2,2-dimethyl-propanoic acid (available from Union Carbide as Ester-diol 204), 955 g of methoxy polyethylene glycol (available as MPEG 2000 from Union Carbode Co.), and 80 g of methyl propyl ketone was placed in a 5-liter flask fitted with a stirrer and condenser. The mixture was heated to 105° C. and held, with stirring, at a temperature of between about 105° C. and 110° C. for a period of two hours. At the end of this time, the mixture was cooled to about 65° C. and a mixture of 51 g of hydroxyethyl acrylate and 8.1 g of butyl hydroxytoluene in 100 g of methyl propyl ketone was added to the reaction mixture. After a few minutes, 3.4 g of a 3.3% weight percent solution of dibutyl tin dilaurate in methyl propyl ketone was added to the flask contents and the mixture was then stirred and held at a temperature of about 65° C. to 70° C. until analysis indicated an isocyanate group meq/g of about 0.33. Trimethylolpropane (86 g) was then added to the reaction mixture and heating at stirring at 65°-70° C. was continued until analysis indicated the absence of isocyanate functionality. The mixture was then cooled and 250 g of ethylene glycol monobutyl ether and 200 g of deionized water were added. The resulting product was 73% non-volatile solids, and had a viscosity of Z3-Z4 on the Gardner-Holt scale. The resin comprised 54.8% by weight methoxy polyethylene glycol and 2.93 % by weight hydroxy ethyl acrylate based on total solids, and had a weight average molecular weight of about 13,800 Daltons.

EXAMPLE 4

Preparation of Ethylenically-Terminated Polyurethane Macromonomer—IV

A mixture of isophorone diisocyanate (488 g), 122.8 g of trimethylolpropane, 1040 g of methoxy polyethylene glycol (available as MPEG 2000 from Union Carbode Co.), and 100 g of methyl propyl ketone was placed in a 5-liter flask fitted with a stirrer and condensor. The mixture was heated to 105° C. and held, with stirring, at a temperature of between about 105° C. and 110° C. for a period of two hours. At the end of this time, the mixture was cooled to about 68° C. and a mixture of 56.6 g of hydroxyethyl acrylate and 8.5 g of butyl hydroxytoluene in 85 g of methyl propyl ketone was added to the reaction mixture After a few minutes, 4.0 g of a 3.3% weight percent solution of dibutyl tin dilaurate in methyl propyl ketone was added to the flask contents and the mixture was then stirred and held at a temperature of about 65° C. to 70° C. until analysis indicated an isocyanate group meq/g of about 0.34. 1,6-Hexanediol (77.3 g) was then added to the reaction mixture and heating at stirring at 65°-70° C. was continued until analysis indicated the absence of isocyanate functionality. The mixture was then cooled and a mixture of 259 g of ethylene glycol monobutyl ether and 3 g of butyl hydroxytoluene was added, followed by 200 g of deionized water. The resulting product was 73% non-volatile solids, and had a viscosity of Z1-Z2 on the Gardner-Holt scale. The resin comprised 58.3% by weight methoxy polyethylene glycol and 4.34 % by weight hydroxy ethyl acrylate based on total solids, and had a weight average molecular weight of about 13,500 Daltons.

EXAMPLE 5

Preparation of Polyurethane/Acrylic Graft Copolymer I

A 5-liter three-neck flask was equipped with a stirrer, condensor, and addition funnel. A mixture of 150 g of methyl propyl ketone and 250 g of ethylene glycol monobutyl ether was charged to the flask and the mixture heated to reflux (about 108° C.).

A mixture was prepared of 400 g of the ethylenically terminated polyurethane macomonomer from Example 1, 170 g of methyl methacrylate, 300 g of butyl acrylate, 250 g of hydroxyethyl acrylate, and 76 g of tert-butyl peroctoate. This mixture was added gradually to the refluxing flask contents over a period of about four hours. When addition was complete, the resulting mixture was allowed to react for an additional one-half hour after which time an additional 10 g of tert-butyl peroctoate, dissolved in 30 g od ethylene glycol monobutyl ether, was added to the flask. The mixture was allowed to react under reflux for an additional one-half hour, after which time the flask contents were cooled and 1800 g of deionized water was added with vigorous stirring.

The product mixture was a clear solution, having 30% non-volatile solids content and a viscosity of about 3000 centipoises and a pH of 4. The product resin had a calculated $T_g$ of $-15°$ C., 16.6% by weight MPEG stabilizer content (based on total solids), 25% by weight hydroxyethyl acrylate content (based on total solids), and a weight average molecular weight of 24,500 Daltons.

EXAMPLE 6

Preparation of Polyurethane/Acrylic Graft Copolymer II

A 5-liter three-neck flask was equipped with a stirrer, condensor, and addition funnel. n-Butanol (275 g) was charged to the flask and heated to reflux.

A mixture was prepared of 425 g of the ethylenically terminated polyurethane macomonomer from Example 2, 150 g of hydroxyethyl acrylate, 120 g of 2-ethylhexyl acrylate, 480 g of butyl acrylate, and 25 g of tert-butyl peroctoate in 75 g of n-butanol. This mixture was added gradually to the flask contents under reflux (about 110°-115° C.) over a period of about four hours. When addition was complete, the mixture was heated under reflux for an additional one-half hour and then cooled. Deionized water (2000 g) was added, and the clear product dispersion was filtered into a container and stored for later use. The product mixture was a clear dispersion, having 30% non-volatile solids content and a viscosity of about 35o? centipoises and a pH of 5.9. The product resin had a calculated $T_g$ of $-6°$ C., 20% by weight MPEG content (based on total solids), 15% by weight hydroxyethyl acrylate content (based on total solids), and a weight average molecular weight of 25,000 Daltons.

EXAMPLE 7

Preparation of Polyurethane/Acrylic Graft Copolymer III

A 5-liter three-neck flask was equipped with a stirrer, condensor, and addition funnel. n-Butanol (410 g) was charged to the flask and heated to reflux.

A mixture was prepared of 238 g of the ethylenically terminated polyurethane macomonomer from Example 3, 350 g of hydroxyethyl acrylate, 179.9 g of 2-ethylhexyl acrylate, 296.7 g of methyl methacrylate, and 12.4 g of tert-butyl peroctoate. This mixture was added gradually to the flask contents under reflux (about 110°-118° C.) over a period of about four hours. When addition was complete, 5.7 g of tert-butyl peroctoate in 35 g of n-butanol was added to the flask and heating was continued for an addition one-half hour. At the end of this time, the mixture was cooled and 2000 g of deionized water was added to the flask contents with vigorous stirring. The product was filtered into a storage container for later use.

The clear product dispersion had a dispersion particle size of 105 nanometers, 30% non-volatile solids content, a viscosity of about 2300 centipoises and a pH of 4.2. The product resin had a calculated $T_g$ of $-6°$ C., 20% by weight MPEG content (based on total solids), 15% by weight hydroxyethyl acrylate content (based on total solids), and a weight average molecular weight of 25,000 Daltons.

EXAMPLE 8

Preparation of Polyurethane/Acrylic Graft Copolymer IV

A 5-liter three-neck flask was equipped with a stirrer, condensor, and addition funnel n-Butanol (430 g) was charged to the flask and heated to reflux.

A mixture was prepared of 209.5 g of the ethylenically terminated polyurethane macomonomer from Example 4, 400 g of hydroxyethyl acrylate, 155 g of 2-ethylhexyl acrylate, 293 g of methyl methacrylate, and 18 g of tert-butyl peroctoate. This mixture was added gradually to the flask contents under reflux (about 110°-118° C.) over a period of about four hours. When addition was complete, the mixture was heated under reflux for an additional one-half hour, at which point 5 g of tert-butyl peroctoate in 35 g of n-butanol was added to the flask and heating was continued for an additional one-half hour. At the end of this time, the mixture was cooled and 1900 g of deionized water was added to the flask contents with vigorous stirring. The product was filtered into a storage container for later use.

The clear product dispersion had a dispersion particle size of 150 nanometers, 29% non-volatile solids content, a viscosity of about 3300 centipoises and a pH of 4.4. The product resin comprised 8.9% by weight MPEG content (based on total solids), 40% by weight hydroxyethyl acrylate content (based on total solids), and a weight average molecular weight of 28,000 Daltons.

EXAMPLE 9

Preparation of Polyurethane/Acrylic Graft Copolymer V

A 5-liter three-neck flask was equipped with a stirrer, condensor, and addition funnel. n-Butanol (410 g) was charged to the flask and heated to reflux.

A mixture was prepared of 145.7 g of the ethylenically terminated polyurethane macomonomer from Example 3, 360 g of hydroxyethyl acrylate, 203 g of 2-ethylhexyl acrylate, 312 g of methyl methacrylate, 19 g of acrylic acid, and 15.5 g of tert-butyl peroctoate. This mixture was added gradually to the flask contents under reflux (about 110°-118° C.) over a period of about four hours. When addition was complete, the mixture was heated under reflux for an additional one-half hour, at which point 5 g of tert-butyl peroctoate in 35 g of n-butanol was added to the flask and heating was continued for an additional one-half hour. At the end of this time, the mixture was cooled and 29 g of 4-ethylmorpholine was added to the flask contents with stirring to neutralize the carboxyl functionality. Following this, 1900 g of deionized water was added to the flask contents with vigorous stirring. The product was filtered into a storage container for later use.

The clear product dispersion had a dispersion particle size of 135 nanometers, 30% non-volatile solids content, a viscosity of about 3700 centipoises, an acid number of 15 based on total solids, and a pH of 7.5. The product resin had a calculated theoretical $T_g$ of 0° C., comprised 15% by weight MPEG content (based on total solids), and had a weight average molecular weight of 32,100 Daltons.

EXAMPLE 10

Preparation of Polyurethane/Acrylic Graft Copolymer VI

A 5-liter three-neck flask was equipped with a stirrer, condensor, and addition funnel. n-Butanol (415 g) was charged to the flask and heated to reflux.

A mixture was prepared of 249.8 g of the ethylenically terminated polyurethane macomonomer from Example 3, 400 g of hydroxyethyl acrylate, 149.8 g of 2-ethylhexyl acrylate, 255.1 g of methyl methacrylate, 13.3 g of acrylic acid, and 18.2 g of tert-butyl peroctoate. This mixture was added gradually to the flask contents under reflux (about 110°-118° C.) over a period of about four hours. When addition was complete, the mixture was heated under reflux for an additional one-half hour, at which point 5 g of tert-butyl peroctoate in 30 g of n-butanol was added to the flask and heating was continued for an additional one-half hour. At the end of this time, the mixture was cooled and 16.4 g of dimethylethanolamine was added to the flask contents with stirring to neutralize the carboxyl functionality. Following this, 1700 g of deionized water was added to the flask contents with vigorous stirring. The product was filtered into a storage container for later use.

The clear product dispersion had a dispersion particle size of 70 nanometers, 31% non-volatile solids content, a viscosity of about 5000 centipoises, an acid number of 10.5 based on total solids, and a pH of 7.85. The product resin had a calculated theoretical $T_g$ of 0° C., comprised 10% by weight MPEG content (based on total solids), and had a weight average molecular weight of 43,000 Daltons.

EXAMPLES 11-16

Preparation of a Water-Borne Silver Base Coat

A series of silver base coat paint formulations were prepared using the polyurethane/acrylic graft polymers prepared as described above in Examples 5 through 10. In each case, a pigment slurry was prepared by thoroughly blending 1450.2 g of aluminum pigment (60% solids) with 1633.8 g of partially methylated melamine (90% active) and 415.2 g of ethylene glucol monobutyl ether. This slurry was then thoroughly blended with the principal resin dispersion of each Example in accordance with the formulations given in Table 1.

Following complete mixing of the aluminum pigment slurry and principal resin dispersion, the rheology control agent was blended into the mixture with high speed mixing. Deionized water was then added to the mixture until the non-volatile content was reduced to about 20% by weight and a viscosity of about 30 seconds in a #2 Fisher cup was achieved.

TABLE 1

| Ingredients | Base Coat Formulations | | | | | |
| --- | --- | --- | --- | --- | --- | --- |
| | Example 11 | Example 12 | Example 13 | Example 14 | Example 15 | Example 16 |
| Aluminum pigment slurry | 583.2 | 583.2 | 583.2 | 583.2 | 583.2 | 583.2 |
| Principal resin dispersion of Example 5 | 1906.0 | — | — | — | — | — |
| Principal resin dispersion | — | 1906.0 | — | — | — | — |

TABLE 1-continued

| | Base Coat Formulations | | | | | |
|---|---|---|---|---|---|---|
| Ingredients | Example 11 | Example 12 | Example 13 | Example 14 | Example 15 | Example 16 |
| of Example 6 | | | | | | |
| Principal resin dispersion of Example 7 | — | — | 1906.0 | — | — | — |
| Principal resin dispersion of Example 8 | — | — | — | 1918.0 | — | — |
| Principal resin dispersion of Example 9 | — | — | — | — | 1906.0 | — |
| Principal resin dispersion of Example 10 | — | — | — | — | — | 1845.0 |
| Rheology control agent 2% aqueous dispersion of Laponite RD ® | 1650.0 | 1650.0 | 1650.0 | 1650.0 | 1650.0 | 1650.0 |

EXAMPLE 17

Preparation of Red Pigment Paste

The polyurethane/acrylic graft copolymer (82.35 g), prepared as described above in Example 9, was thoroughly mixed over a period of about one-half hour, with 12.9 g of C. I. Pigment Red 202 (available as Magenta B RT-343-D from Ciba-Geigy Corp., Three Skyline Drive, Hawthorne, N.Y. 10532). This mixture was diluted by the addition of 4.75 g of deionized water and again mixed. This mixture had a viscosity of 66 Krebs units, and had a pH of 7.8.

An attritor was loaded with $\frac{1}{8}"$ steel media and charged with the above mixture. After 3 hours, the pigment particle size was found to be about 6 on the Hegman scale, and the suspension had a viscosity of 68 Krebs units and a pH of 7.8. The mixture contained 20.59% by weight polyurethane/acrylic graft copolymer and 1.90% by weight pigment, based on total solids.

Testing

Each base coat formulation of Examples 11 through 16 was hand sprayed over an electrocoated cold rolled steel panel at 80° F. (26.7° C.) at 60% relative humidity. Two sets of panels were prepared. In one set, the base coat was applied, flash dried, and overcoated with a clear coat layer, with both layers being subsequently bake cured. In the other set, only a base coat layer was applied prior to the bake curing step. In the case of panels which received a subsequent clear coat layer, following application of the base coat, each panel was placed in an oven at 110.F (43.3° C.) for five minutes to flash dry the base coat layer. A layer of high solids clear coat containing a highly alkylated melamine (Cymel ® 303, available from American Cyanamid Co., Wayne, N.J. 07470) was then spray applied over the uncured base coat layer. The double-coated panels were then placed in an oven at 250° F. (121° C.) for thirty minutes to cure both layers. In the case of the panels which did not receive a clear top coat layer, the panels were bake cured at 250° F. (121° C.) following spray application of the base coat layer.

The panels which had received a base coat layer only were subjected to a solvent rub test and the results compared with similarly prepared panels which had received a base coat layer prepared from a polyurethane principal resin of the type disclosed in U.S. Pat. No. 4,794,147. In this test, a soft cloth was saturated with methyl ethyl ketone and the cloth was then rubbed in a back-and-forth motion over the coated panel until there was evidence of softening or removal of the baked base coat layer. In this test, the prior art polyurethane base coat layer showed softening or failure after ten to fifteen rubs, while the panels coated with the polyurethane/acrylic graft resin coatings of the present invention did not show any softening before fifty to one-hundred rubs.

In another test, the panels which had received both a base coat layer in accordance with this invention and a clear coat layer were subjected to conditions of 100% relative humidity and 100° F. (37.8° C.) temperature for a period of ten days. After this treatment, each of the panels was scribed with an awl to produce a large "X" on the panel, cutting through the coating layers to the bare substrate metal. A piece of adhesive tape is pressed over the scribe mark, and pulled away. Removal of any of the coating layers is considered adhesive failure. The results of the adhesion tape-pull tests are given in Table 2.

TABLE 2

| Example | Results of Adhesion Tape-Pull Test |
|---|---|
| 11 | Pass |
| 12 | Pass |
| 13 | Pass |
| 14 | Pass |
| 15 | Pass |
| 16 | Pass |

As discussed above, the use of an amine-solubilized base coat formulation with a high solids type clear coat formulation often causes problems. Amines, freed from the basecoat layer during the bake curing step will partically neutralize the strong acid catalyst required for curing of the monomeric fully alkylated melamine cross-linking resins contained in a high solids clear top coat. The result is severe loss of "distinctness of image" or DOI. DOI is the glossiness of the topcoat, and can be measured, in one technique, by the use of ASTM 4449-85 in which the scattering of light at the edges of a specularly reflected beam of light from the top coat surface is measured.

The DOI of panels coated with the formulations of Examples 11-16 and overcoated with a super high solids acrylic clear coat cross-linked with a monomeric fully alkylated melamine resin appear in Table 3, compared with a panel which had been coated with a prior art anionic polyurethane basecoat and the same top coat formulation. In addition, Table 3 shows the DOI values for panels coated with the basecoat formulations of Examples 12-17 and overcoated with a high solids acrylic clear coat usings a a polymeric partically alkylated melamine cross-linking agent.

TABLE 3

| Base Coat of Example | Clear Coat Type | DOI |
| --- | --- | --- |
| 11 | High-solids acrylic, monomeric highly alkylated melamine cross-linker | 85 |
| 12 | High-solids acrylic, monomeric highly alkylated melamine cross-linker | 83 |
| 13 | High-solids acrylic, monomeric highly alkylated melamine cross-linker | 86 |
| 14 | High-solids acrylic, monomeric highly alkylated melamine cross-linker | 85 |
| Prior art anionic polyurethane | High-solids acrylic, monomeric highly alkylated melamine cross-linker | 5 |
| 11 | High-solids acrylic, polymeric, partially alkylated melamine cross-linker | 83 |
| 12 | High-solids acrylic, polymeric, partially alkylated melamine cross-linker | 85 |
| 13 | High-solids acrylic, polymeric, partially alkylated melamine cross-linker | 85 |
| 14 | High-solids acrylic, polymeric, partially alkylated melamine cross-linker | 86 |
| Prior art anionic polyurethane | High-solids acrylic, polymeric, partially alkylated melamine cross-linker | 85 |

As can be seen by examining the data in Table 3, when a high solids acrylic top coat formulation, employing a monomeric highly alkylated melamine cross-lining agent, is applied over the base coat formulations of the present invention, good gloss and distinctness of image is maintained for the resulting multi-layer coating. In contrast, when a typical prior art water-borne polyurethane base coat formulation, solubilized by amine, is employed with the same top coat, considerable loss in distinctness of image occurs. That this result is due to interference with amine (derived from the base coat layer) with the strong acid catalyst in the top coat, can be seen by examining the data in the last half of Table 3. There, a high-solids acrylic top coat formulation which is cross-linked with a polymeric partially-alkylated melamine cross-linking agent which does not require strong acid catalysts for cross-linking. The gloss and distinctness of image for both the coatings of this invention and for the prior art amine-solubilized polyurethane coatings is good.

While there have been shown and described by example the preferred embodiments of the present invention, it is to be understood that the examples are merely illustrative and are not to be read as limiting the scope of the present invention as defined by the appended claims.

I claim:

1. A water dilutable polyurethane/acrylic graft copolymer comprising the reaction product of:
   A) an ethylenically terminated polyurethane macromonomer that is the reaction product of:
      1) a polyisocyanate;
      2) a compound having at least two functional groups reactive with isocyanate;
      3) a polyether having a single functional group reactive with isocyanate; and
      4) an ethylenically unsaturated monomer containing a group that is reactive with said isocyanate; and
   B) one or more other ethylenically unsaturated monomers.

2. A graft copolymer as defined by claim 1 wherein said compound having at least two functional groups reactive with isocyanate is selected from the group consisting of, diols, triols, and mixtures thereof.

3. A graft copolymer as defined by claim 1 having a weight average molecular weight between about 15,000 Daltons and about 60,000 Daltons.

4. A graft copolymer as defined by claim 2 wherein said compound having at lest two functional groups reactive wit isocyanate is selected from the group consisting of straight chain and branched chain aliphatic diols of from three to twenty carbon atoms and mixtures thereof.

5. A graft copolymer as defined by claim 4 wherein said compound having at least two functional groups reactive with isocyanate is selected from the group consisting of ethylene glycol, propylene glycol, butylene glycol, neopentyl glycol, 1,6-hexanediol and mixtures thereof.

6. A graft copolymer as defined by claim 2 wherein said compound having at least two functional groups reactive with isocyanate is selected from the group consisting of straight chain and branched chain aliphatic triols of from three to twenty carbon atoms and mixtures thereof.

7. A graft copolymer as defined by claim 6 wherein said compound having at lest two functional groups reactive with isocyanate is selected form the group consisting of trimethylolethane, trimethylolpropane, and pentaerythritol and mixtures thereof.

8. A graft copolymer as defined by claim 2 wherein said compound having at least two functional groups reactive with isocyanate is selected from the group consisting of polyester polyols of from four to twenty carbon atoms.

9. A graft copolymer as defined by claim 8 wherein said polyester polyol is the 3-hydroxy-2,2-dimethylpropyl ester of 3-hydroxy-2,2-dimethylpropanoic acid.

10. A graft copolymer as defined by claim 1 wherein said polyisocyanate is selected from the group consisting of aliphatic polyisocyanates, cycloaliphatic polyisocyanates, aliphatic isocyanurates, and mixtures thereof.

11. A graft copolymer as defined by claim 10 wherein said polyisocyanate is selected from the group consisting of 1,4-tetramethylene diisocyanate, 1,6-hexamethylene diisocyante, 2,2,4-trimethylhexane-1,6-diisocyante, 1,3-bis-[2-(2-(isocyanato)propyl]benzene (TMXDI), meta-xylylene diisocyante, bis-(isocyanatoethyl fumarate), isophorone diisocyante (IPDI), and methylene bis-(4-cyclohexylisocyanate).

12. A graft copolymer as defined by claim 1 wherein said other ethylenically unsaturated monomer is selected from the group consisting of
   acrylic acid,
   methacrylic acid,
   $C_1$–$C_6$ alkyl esters of acrylic acid,
   $C_1$–$C_6$ alkyl esters of methacrylic acid,
   $C_1$–$C_6$ hydroxyalkyl esters of acrylic acid, C$_1$-C$_6$ hydroxyalkyl esters of methacrylic acid,
C$_1$-C$_6$ alkyl esters of fumaric acid,
C$_1$-C$_6$ hydroxyalkyl esters of fumaric acid,
styrene, and
vinyltoluene.

13. A graft copolymer as defined by claim 1 wherein said polyether is selected from the group consisting of polyether alcohols and polyether amines.

14. A graft copolymer as defined by claim 13 wherein said polyether is selected form the group consisting of polyether alcohols having a weight average molecular weight between about 1200 and 3000 Daltons.

15. A graft copolymer as defined by claim 1 wherein said ethylenically terminated polyurethane macromonomer has a weight average molecular weight of between about 3,000 Daltons and 20,000 Daltons.

16. A graft copolymer as defined by claim 14 wherein said graft copolymer contains between about 5% and about 25% by weight of said polyether alcohols.

17. A nonionically stabilized, water dilutable polyurethane/acrylic graft copolymer as defined by claim 1 wherein the polyether is 12 to 25 weight percent of the copolymer, with the proviso that none of the ethylenically unsaturated monomers contains a carboxyl group.

18. A partially nonionically stabilized, partially anionically stabilized water dilutable polyurethane/acrylic graft copolymer as defined by claim 1 wherein the polyether is 5 to 15 weight percent of the copolymer, and wherein the ethylenically unsaturated monomers include small amounts of acrylic or methacrylic acid, or both.

19. A pigment paste comprising between about 30% by weight and about 80% by weight of a water dilutable polyurethane/acrylic graft copolymer as defined by claim 1 and one or ore pigmenting agents.

20. A substrate body coated with one or more base coat layers of a coating composition comprising a water-dilutable polyurethane/acrylic graft copolymer as defined by claim 1.

21. A graft copolymer as defined in claim 1 wherein said compound having at least two functional groups reactive with isocyanate comprises an ester polyol.

22. A graft copolymer as defined by claim 1, wherein said reaction product of A) has isocyanate functional groups; and wherein the isocyanate functional groups are first reacted with a capping agent before the reaction with the one or more other ethylenically unsaturated monomers of B).

23. A graft copolymer as defined by claim 22, wherein said capping agent is selected from the group consisting of diols, triols, aminopolyols other than diols or triols, and mixtures thereof.

24. A graft copolymer as defined by claim 22 wherein said capping agent is selected from the group consisting of straight chain and branched chain diols of from three to twenty carbon atoms.

25. A graft copolymer as defined by claim 22, wherein said capping agent is ethylene glycol, propylene glycol, butylene glycol, neopentyl glycol, or 1,6-hexanediol.

26. A graft copolymer as defined by claim 22, wherein said capping agent is selected from the group consisting of straight chain and branched chain aliphatic triols of from three to twenty carbon atoms, and mixtures thereof.

27. A graft copolymer as defined by claim 26 wherein said triol is selected form the group consisting of trimethylolethane, trimethylolpropane, pentaerythritol, and mixtures thereof.

28. A graft copolymer as defined by claim 22, wherein said capping agent is an aminopolyol of from two to twenty carbon atoms.

29. A graft copolymer as defined by claim 28, wherein said capping agent is selected from the group consisting of aminoethanol, diethanolamine, and 4-(2-hydroxyethyl)morpholine.

30. A method for reducing the amount of hydrophilic groups in a water dilutable polyurethane/acrylic graft copolymer, comprising reacting a polyether containing polyurethane macromonomer with one or more ethylenically unsaturated, carboxyl-functional monomers.

31. A substrate coated with at least one base coat layer comprising a water dilutable polyurethane/acrylic graft copolymer prepared according to the method of claim 30.

32. A method of applying a basecoat containing a water dilutable acrylic polymer, comprising the steps of:
  A. Forming a water dilutable polyurethane/acrylic graft copolymer comprising the reaction product of:
    1) an ethylenically terminated polyurethane macromonomer that is the reaction product of:
      a) a polyisocyanate;
      b) a compound having at least two functional groups reactive with isocyanate;
      c) a polyether having a single functional group reactive with isocyanate; and
      d) an ethylenically unsaturated monomer containing a group that is reactive with said isocyanate; and
    2) one or more other ethylenically unsaturated monomers;
  B. Combining the graft copolymer with at least one pigment to form a paint composition; and
  C. Spraying the paint composition onto a substrate.

* * * * *